UNITED STATES PATENT OFFICE.

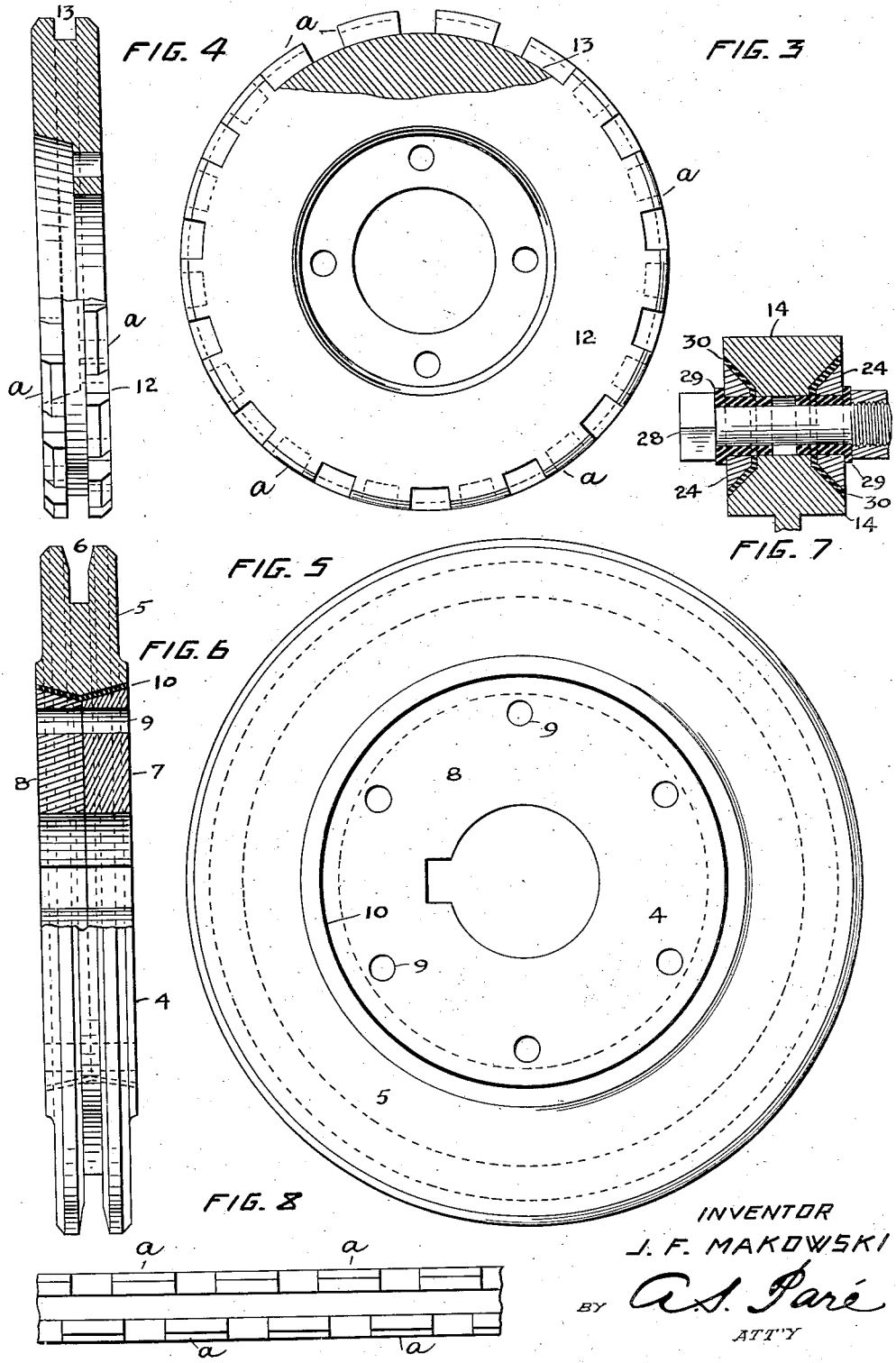

JOHN F. MAKOWSKI, OF SAN FRANCISCO, CALIFORNIA, ASSIGNOR OF ONE-HALF TO CHARLES HOLLOWAY, JR., OF SAN FRANCISCO, CALIFORNIA.

WELDING-MACHINE.

1,234,365.      Specification of Letters Patent.      Patented July 24, 1917.

Application filed November 24, 1915. Serial No. 63,240.

*To all whom it may concern:*

Be it known that I, JOHN F. MAKOWSKI, citizen of the United States, residing at the city and county of San Francisco, State of California, have invented certain new and useful Improvements in Welding-Machines, whereof the following is a specification.

This invention relates to welding machines and is designed more particularly for welding together strips of expanded metal and various shaped ribs, and especially the metallic lathing disclosed in my pending application Serial No. 839,969, filed May 21, 1914, for re-inforced metal lathing.

In carrying out the invention I construct a machine, having guide or supporting rollers, upon which the material to be welded is carried in its passage through the machine, and having also welding rollers which are supplied with electric current and direct the same through the points to be joined. One of these welding rollers bears upon the material with a spring pressure, and also is adjustable to vary the tension of the spring, and to accommodate different thicknesses of material. A suitable flywheel is provided to give a steady and uniform movement to the machine. The welding rollers, as also the guide or supporting rollers, may be arranged in series of any desired number on shafts, supported by suitable framing. Insulation is provided at required points.

I will now proceed to describe in detail an embodiment of my invention in a machine for welding the material already referred to, it being understood however that such description is illustrative merely, the structure being capable of being varied in many ways obvious to the mechanic. In this description I refer to the accompanying three sheets of drawing, in which:—

Fig. 3 is a face elevation of one of the welding rollers.

Fig. 4 is an edge view of the same partly in section.

Fig. 5 is a face elevation of the opposing welding roller.

Fig. 6 is an edge view of the latter, partly in section.

Fig. 7 is a sectional view, taken on the line 7, 7, of Fig. 1 to show the insulation applied to the carrying arm of the welding roller, shown in Figs. 3 and 4.

Fig. 8 is a diagrammatic view of the working edge of the welding roller shown in Figs. 3 and 4.

In these several figures:—

Figure 1:
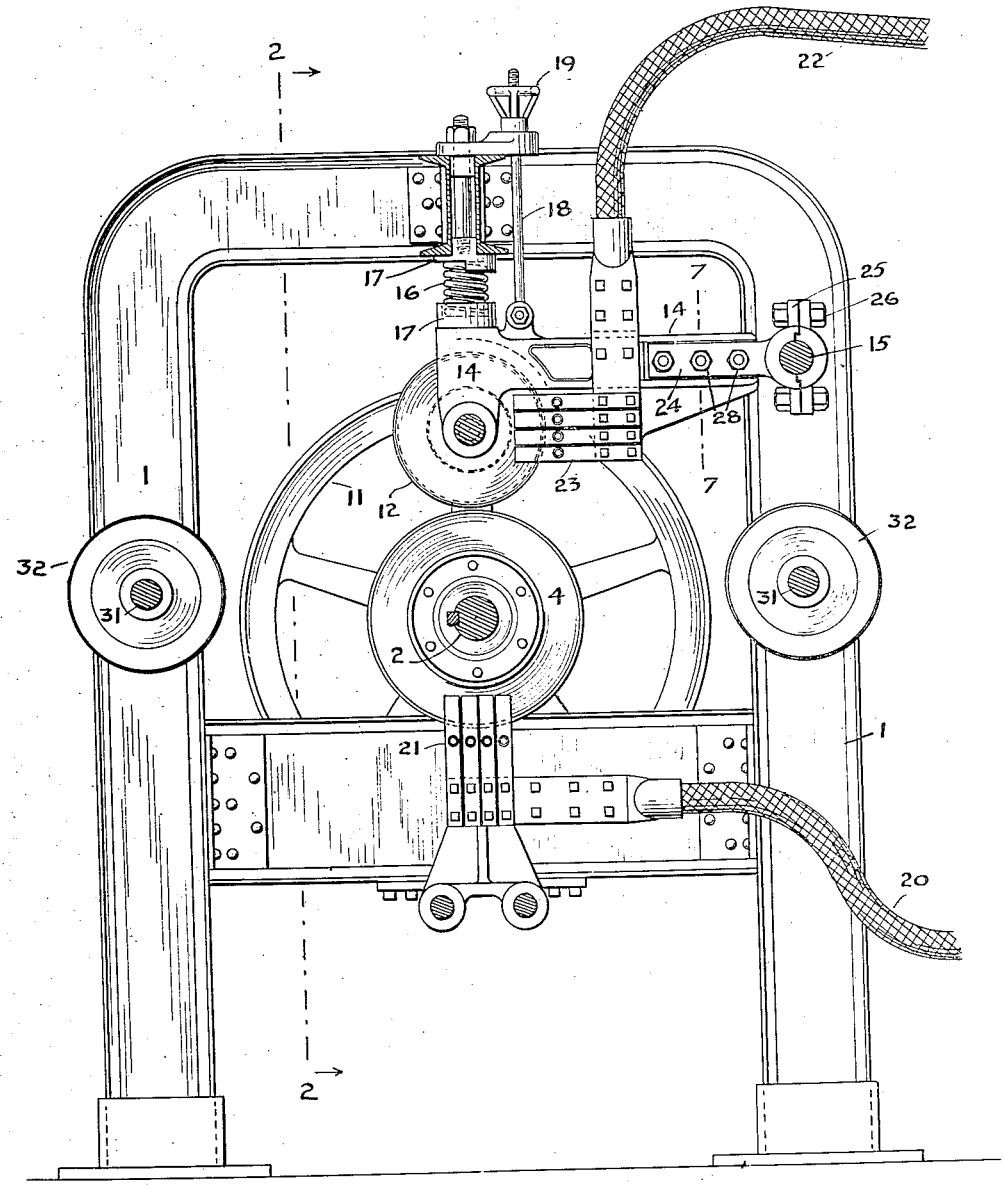
Figure 1 is a sectional elevation, taken on the line 1, 1, of Fig. 2, in the direction of movement of the material to be acted upon.
Figure 2:
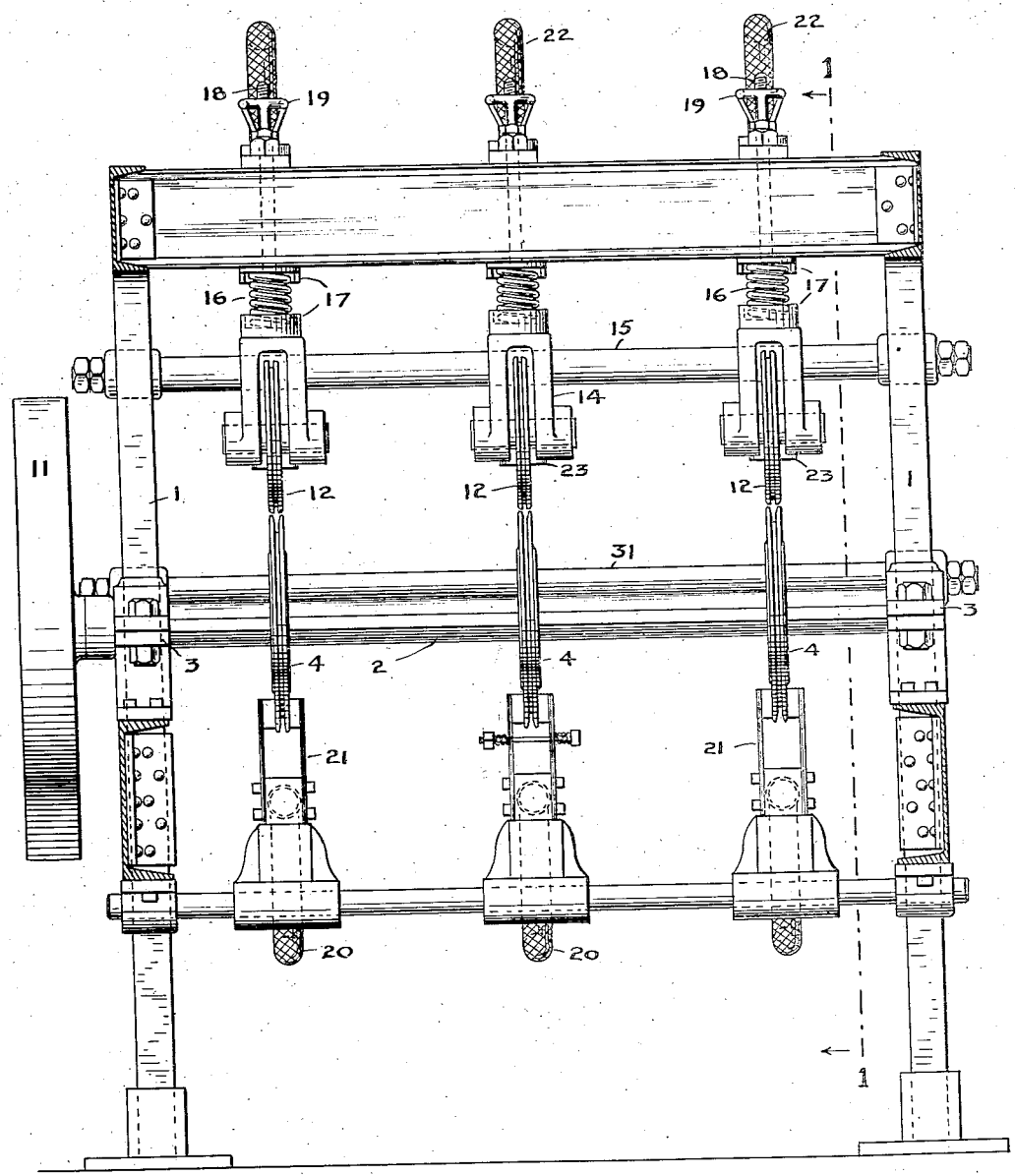
Fig. 2 is a sectional elevation, at right angles to Fig. 1, and taken upon line 2, 2, of that figure.

1 represents the frame of the machine, which is provided with suitable bearings for the various parts of the mechanism, as will be more fully described hereinafter.

2 is a shaft extending crosswise of the machine, and mounted in bearings at 3, 3.

Upon the shaft 2, at desired intervals, are keyed the welding rollers 4. These rollers are composed of the solid rim portion 5, having the groove 6, as shown in Fig. 6, and of the two center portions 7, 8, which are to be bolted together by bolts or rivets passing through the holes 9, and of the insulation 10, which insulates the rim from the center.

11 is a flywheel upon shaft 2, by preference at one end thereof.

The companion rollers to the rollers 4, are shown at 12, see Figs. 3 and 4. These rollers have toothed rims with grooves 13, registering with the analogous parts of rollers 4. Each roller 12, is mounted in a forked arm 14, pivoted at 15 to the frame 1, and carrying the roller at its free end. The pressure of the roller against its companion, or the material between them, is caused by the spring 16, which is seated in chairs 17 upon the arm and the frame. Adjustment may be made by the insertion of shims in the chairs. The rod 18 and hand nut 19 serve to raise the wheel from its contact when it is not desired to have current pass at that point.

Current is supplied to the rollers 4 by the mains 20 and brushes 21, which bear against the rollers. And, similarly, current is supplied to rollers 12 by the mains 22, and brushes 23 bearing against said rollers.

Brushes 21 and 23 may be insulated in any desired manner. I have shown in Fig. 7 a means for insulating the brushes 23. The members 24 are clamped upon the shaft 15 by the flanges 25 and bolts 26. These members support the wheel carrying member 14 to which they are secured by means of the bolts 28, passing through non-conducting sleeves 29; and the members 14 and 24 are separated by the insulation 30.

The teeth $a$ which form the rim of the wheel 12, as shown in Figs. 3, 4 and 8, are staggered or offset in the two flanges so that the current passes alternately through one and the other.

Mounted upon the shaft 31, secured to the frame 1, are adjustable idlers 32 adapted to receive and support the incoming and outgoing materials to be welded between the rollers 4 and 12. These idlers are provided with grooves (not shown) similar however to the grooves 6 of the rollers 4 and are intended to guide the material to the welding rollers.

In operation the material is fed through between the welding rollers, and the V shape flanges, shown in my pending application above referred to, are received by the grooves 6 and 13 of the welding wheels from the idlers 32. The toothed arrangement of the rim of the wheel 12 and staggered disposition of these teeth cause welds to be formed at intervals on both sides of said V. This is important as a continuous weld is not desirable and the intermittent welds are thus formed at offset intervals.

Having thus described my invention, and an embodiment of it, in the full, clear and exact terms required by law, and knowing that it comprises novel, useful and valuable improvements in the art to which it pertains, I here state that I do not wish to be limited to the precise construction and arrangement of the several parts, as herein set forth, as the same may be variously modified by a skilled mechanic without departing from the spirit of the invention.

What I claim and desire to secure by Letters Patent of the United States, is the following, to-wit:—

Claims.

1. A welding machine comprising opposed welding rollers through which the current is passed to the material to be welded, one of said rollers being provided with toothed rims and a groove therebetween adapted to form intermittent contacts.

2. A welding machine comprising opposed welding rollers, one of said rollers provided with a central groove forming lateral rims, said rims having intermittent contacts on their peripheries.

3. A welding machine comprising welding rollers between which the material to be welded is passed, one of said rollers provided with a forked arm having a spring to determine its pressure upon the material.

4. A welding machine comprising a series of welding rollers having toothed rims arranged to form intermittent contacts, a series of opposed spring-controlled welding rollers, and means for supplying current to the rollers of said series.

5. A welding machine comprising opposed welding rollers adapted to press upon the material to be welded and forked arms for supporting said rollers out of contact with the material.

6. A welding machine comprising opposed welding rollers, one of said rollers being adapted to press upon the material to be welded, a forked arm for supporting said roller, and adjustable means for holding said arm.

7. A welding machine comprising opposed welding rollers, one of said rollers having a double toothed rim, with a channel between the circumferential rows of teeth, said roller being adapted to press upon the material to be welded, and a forked arm for supporting said last roller out of contact with the material.

8. A welding machine comprising opposed welding rollers, one of said rollers having a double toothed rim, the teeth thereof being staggered, and means for supplying current to the rollers, consisting of brushes connected to the supply main and engaging the face sides of said rollers.

In testimony, that I claim the foregoing I have hereto set my hand in the presence of two witnesses, this 18th day of November, 1915.

JOHN F. MAKOWSKI.

Witnesses:
 CHAS. HOLLOWAY, Jr.,
 LÉON BOILLOT.